Nov. 19, 1940.   B. A. DIGGINS ET AL   2,221,912
LIQUID LEVEL
Original Filed June 27, 1935
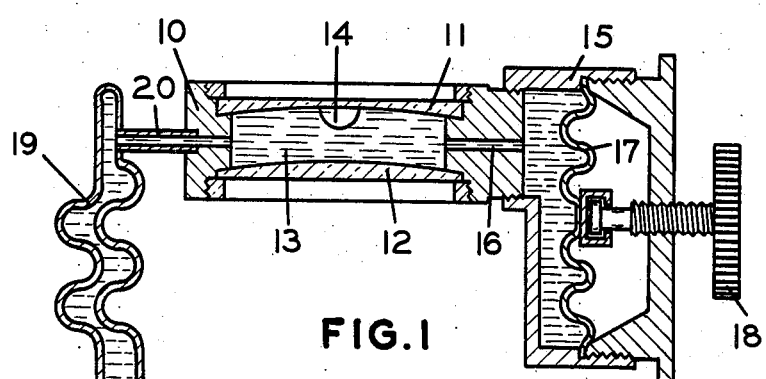
FIG.1
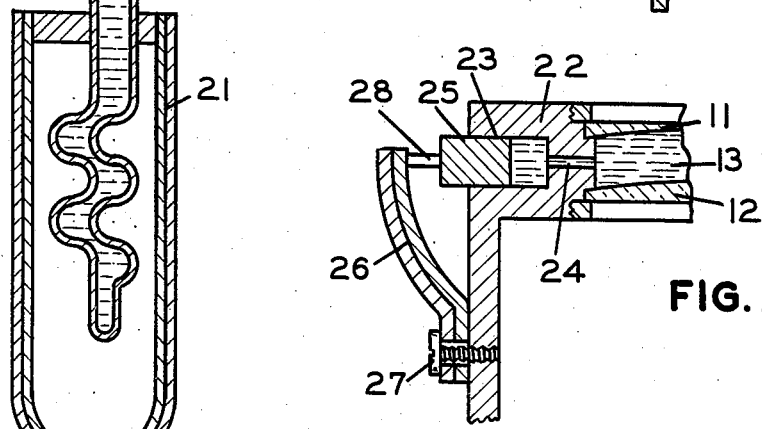
FIG.2
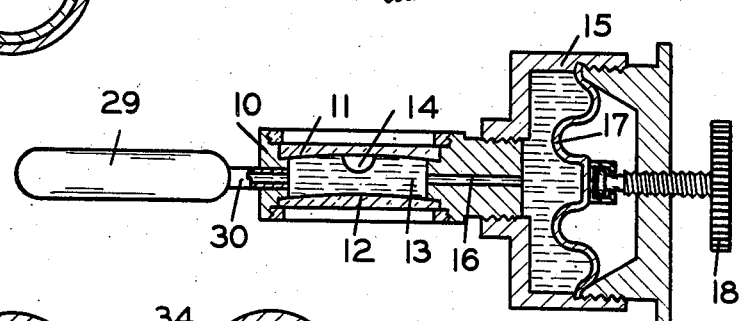
FIG.3
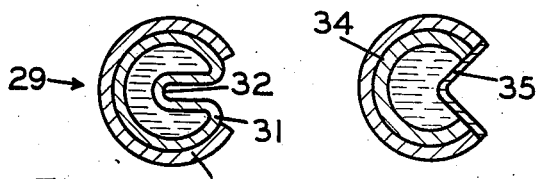
FIG.4   FIG.5
BARTHOLOMEW A. DIGGINS
GEORGE B. GALLASCH
INVENTORS
BY 
ATTORNEY Patented Nov. 19, 1940

2,221,912

UNITED STATES PATENT OFFICE 2,221,912

LIQUID LEVEL

Bartholomew A. Diggins and George B. Gallasch, Rochester, N. Y., assignors to Bausch & Lomb Optical Company, Rochester, N. Y., a corporation of New York Refiled for abandoned application Serial No. 28,686, June 27, 1935. This application November 13, 1939, Serial No. 303,952

3 Claims. (Cl. 33—212)

This application is refiled for application Serial No. 28,686 filed June 27, 1935 by Bartholomew A. Diggins and George B. Gallasch for a Liquid level.

The present invention relates to liquid levels and more particularly to a means for automatically compensating for the thermal expansion of the liquid.

One of the objects of the present invention is to provide a liquid level in which the thermal expansion of the liquid is automatically compensated. Another object is to provide a liquid level having an auxiliary chamber, the volume of which is automatically changed in response to temperature changes. A further object is to provide a liquid level in which the bubble is maintained at a predetermined size regardless of temperature changes. These and other objects and advantages reside in certain novel features of construction, arrangement and combination of parts as will hereinafter be more fully set forth and pointed out in the appended claims.

Referring to the drawing:

Fig. 1 is a sectional view of one embodiment of this invention.

Fig. 2 is a fragmentary sectional view of a modification.

Fig. 3 is a sectional view of another modification.

Figs. 4 and 5 are sectional views of expansible chambers for use in the modification shown in Fig. 3.

In the embodiment shown in Fig. 1, 10 indicates a bubble chamber carrying lenses 11 and 12 between which are the liquid 13 and the bubble 14. A chamber 15 is in communication with the bubble chamber 10 through a passageway 16. A flexible wall or diaphragm 17 forms one wall of the chamber 15 and is under the control of a screw 18 so that the size of the bubble 14 may be readily regulated. This regulating mechanism is substantially the same as that shown in Patent No. 1,674,550 to F. L. Hunt et al.

A flexible chamber or bellows 19 is also connected to the bubble chamber 10 through a passageway 20. Fixedly connected to each wall of the chamber or bellows 19 is a heat responsive device such as the bimetallic strip 21. The chamber 19 is made with thin flexible walls and the heat responsive strip 21 is selected so that the increase in volume of the chamber 19 due to the opening of the heat responsive strip 21 is substantially the same as the thermal expansion of the liquid 13.

In the modification shown in Fig. 2, the bubble chamber 22 has a cylinder 23 which communicates with the fluid 13 between the lenses 11 and 12 by a passageway 24. A piston 25 is slidable in the cylinder 23 under the action of the heat responsive strip 26 which is fixedly secured at one end to the chamber 22 by a screw 27. For originally obtaining the desired bubble size, the modification of Fig. 2 may be provided with a chamber 15 as shown in Fig. 1.

In the modification shown in Fig. 3 an expansible chamber or bellows 29 is connected to the bubble chamber 10 by a passageway 30. Figs. 4 and 5 illustrate two forms which this chamber 29 might take. Fig. 4 shows a form in which a completely closed capsule 31 of flexible metal having a high coefficient of expansion is crimped as at 32 and is provided with a jacket 33 of metal having a lower coefficient of expansion. Upon heating, the bimetallic wall will tend to straighten and thus the volume of the chamber will be increased. In the form shown in Fig. 5, the cylindrical chamber is formed by a bimetallic wall 34 and a flexible wall 35. Here again heating causes the chamber to increase in volume.

From the foregoing it will be apparent that we are able to attain the objects of our invention and provide an improved liquid level in which the thermal expansion of the liquid is substantially compensated. While the heat responsive element has been shown as a bimetallic strip, obviously other thermo-mechanical elements can be substituted. Various modifications can, of course, be made without departing from the spirit of our invention or the scope of the appended claims.

We claim:

1. A liquid level comprising a bubble chamber, a second chamber in communication therewith, said second chamber having a bimetallic wall and a flexible wall whereby the volume of said chamber will change with changes of temperature.

2. A liquid level comprising a bubble chamber, a regulation chamber, a passageway between said chambers, manual means for changing the volume of said regulation chamber to regulate the size of the bubble in the bubble chamber, a compensation chamber, a passageway between said compensation chamber and said bubble chamber, and heat actuated means to change the volume of said compensation chamber to compensate for thermal expansion of the liquid.

3. A liquid level comprising a bubble chamber, a regulation chamber, a passageway between said chambers, manual means for changing the volume of said regulation chamber to regulate the size of the bubble in the bubble chamber, a compensation chamber having flexible walls, a passageway between said compensation chamber and said bubble chamber, a liquid in said chambers, and heat actuated means for flexing the walls of said compensation chamber to change the volume thereof and compensate for thermal expansion of the liquid.

BARTHOLOMEW A. DIGGINS.
GEORGE B. GALLASCH.